United States Patent
Chrysler

Patent Number: 5,628,370
Date of Patent: May 13, 1997

[54] LAWN AND GARDEN TOOL

[76] Inventor: R. William Chrysler, 1999 Buford St., Alva, Fla. 33920

[21] Appl. No.: 662,078

[22] Filed: Jun. 12, 1996

Related U.S. Application Data

[60] Provisional application No. 60/003,948 Sep. 19, 1995.

[51] Int. Cl.$^6$ ............................ A01B 27/00; A01B 1/10
[52] U.S. Cl. .................. 172/372; 172/370; 172/371
[58] Field of Search ........................... 15/144.1, 144.4, 15/172; 16/110 R; 403/4, 87, 321; 172/371, 372, 375, 378, 380

[56] References Cited

U.S. PATENT DOCUMENTS

| | | | |
|---|---|---|---|
| 538,146 | 4/1895 | Bailey | 172/372 |
| 1,202,772 | 10/1916 | Baird | 172/371 |
| 1,398,342 | 11/1921 | Pleaue | 172/371 X |
| 1,896,568 | 2/1933 | Ammons | 172/372 X |
| 2,011,062 | 8/1935 | Masamitsu | 97/68 |
| 2,364,208 | 12/1944 | Gravely | 172/372 |
| 3,000,452 | 9/1961 | Adams | 172/372 |
| 3,545,551 | 12/1970 | Niemeyer | 172/371 |
| 3,623,556 | 11/1971 | Adams | 172/371 |
| 4,730,679 | 3/1988 | Tallerico et al. | 172/375 |
| 5,161,278 | 11/1992 | Tomm | 15/159 |
| 5,272,788 | 12/1993 | Gilstrap | 16/114 |
| 5,433,278 | 7/1995 | Shipley | 172/372 X |

*Primary Examiner*—Terry Lee Melius
*Assistant Examiner*—Robert Pezzuto
*Attorney, Agent, or Firm*—Frank A. Lukasik

[57] ABSTRACT

The invention is a wooden handled, heart shaped, garden tool configured to perform various garden tasks. The tool includes multiple edges and angles configured to perform various garden tasks and a bolt attached thereon at 36° to mate with a handle connector equipped with three different angled mounting bosses. One boss comes straight from the end of the connector, the second boss is ninety degrees from the connector and handle, and the third boss is fifty four degrees from the connector and handle. A coupling has also been designed for the center of the of the handle to allow it to be taken apart for the ease of shipping or storing or to add a longer length handle section.

4 Claims, 9 Drawing Sheets

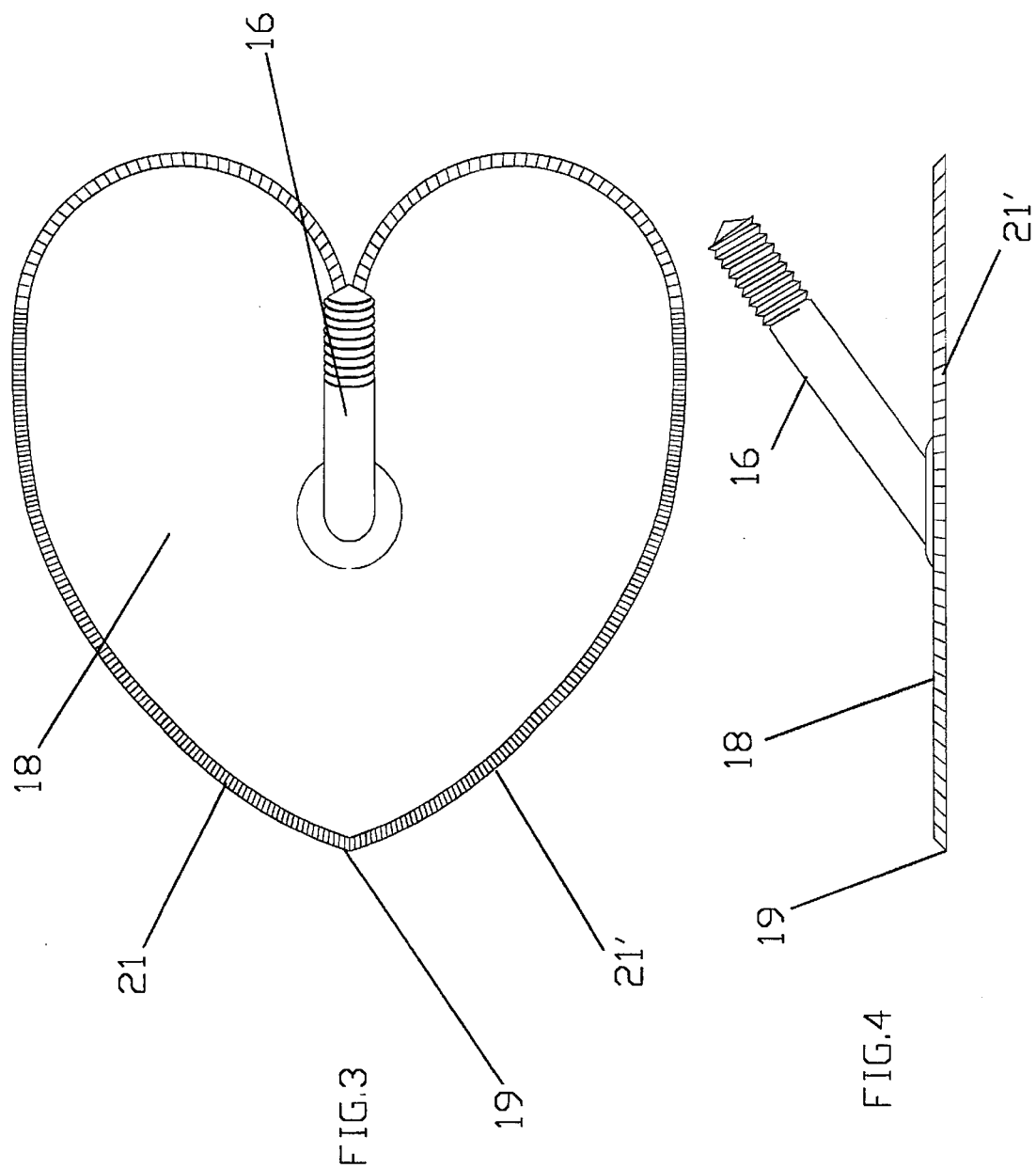

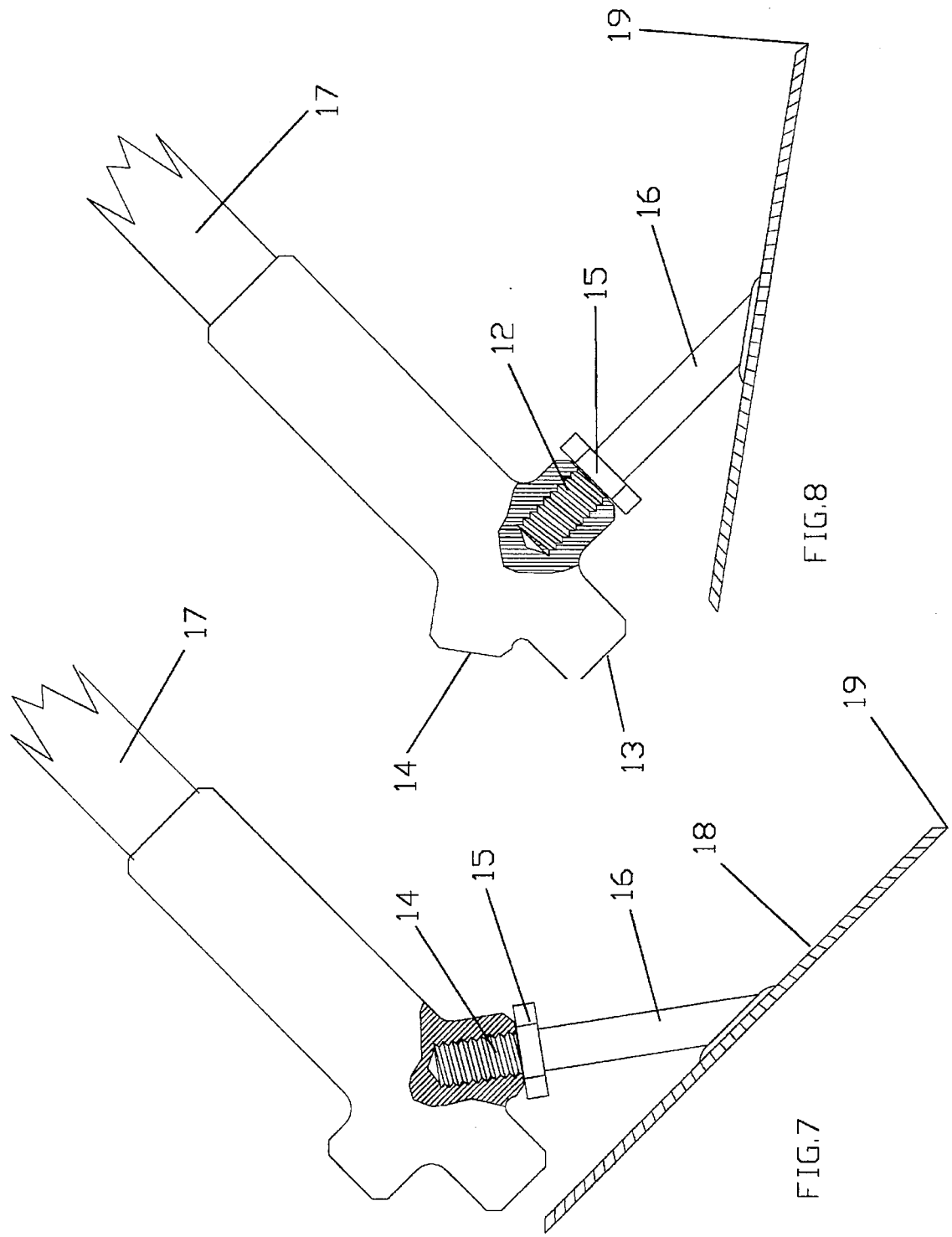

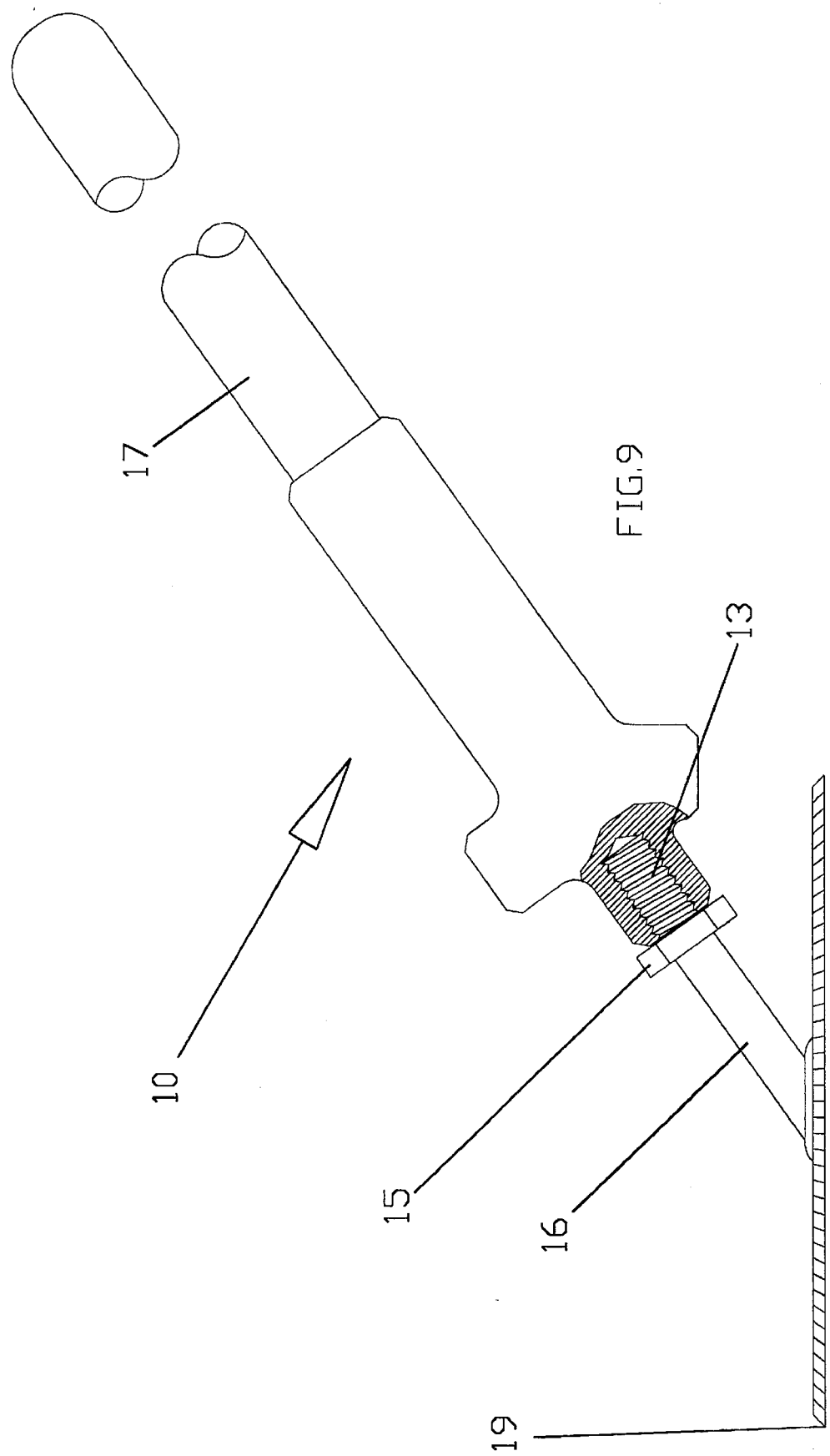

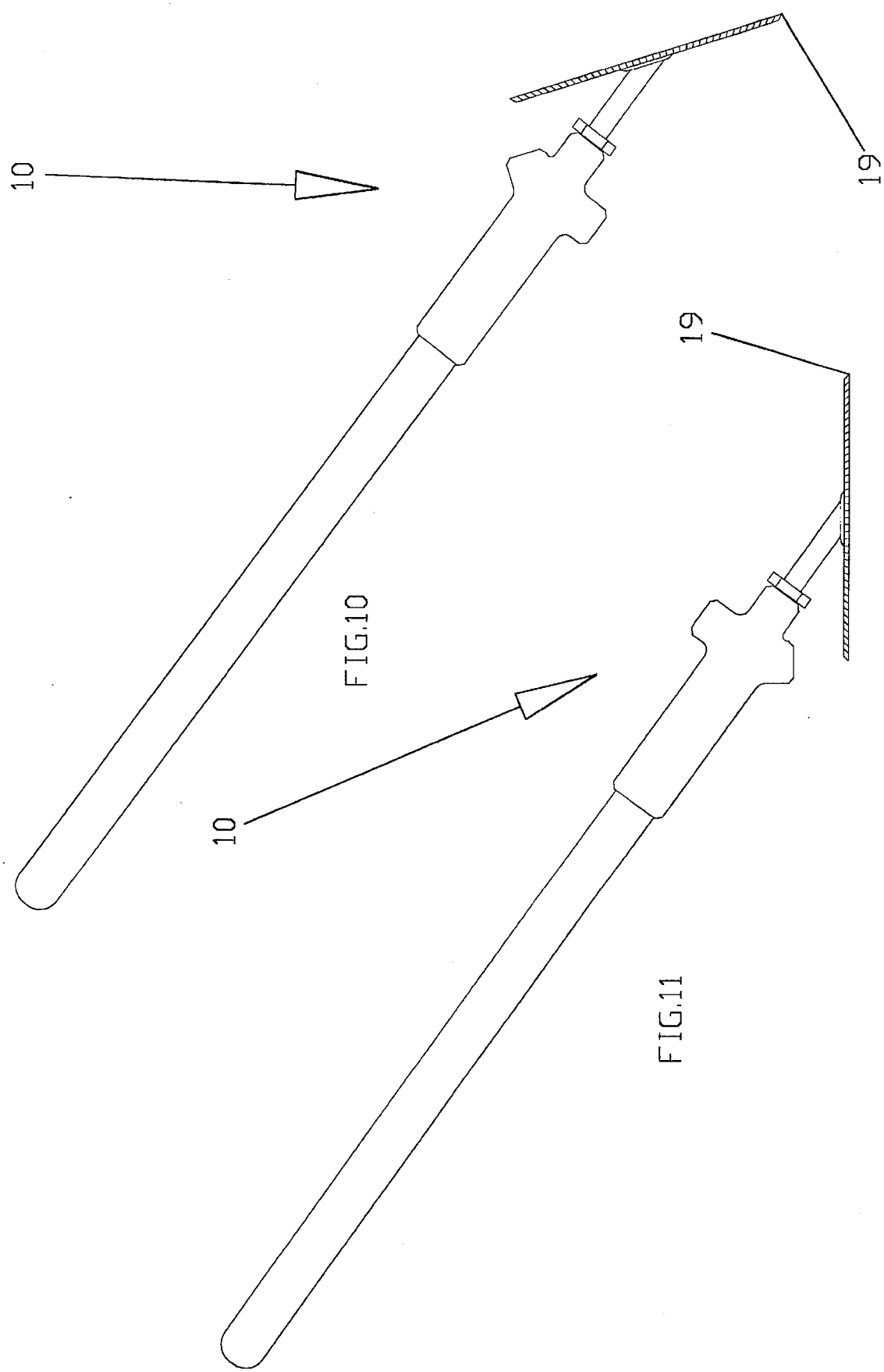

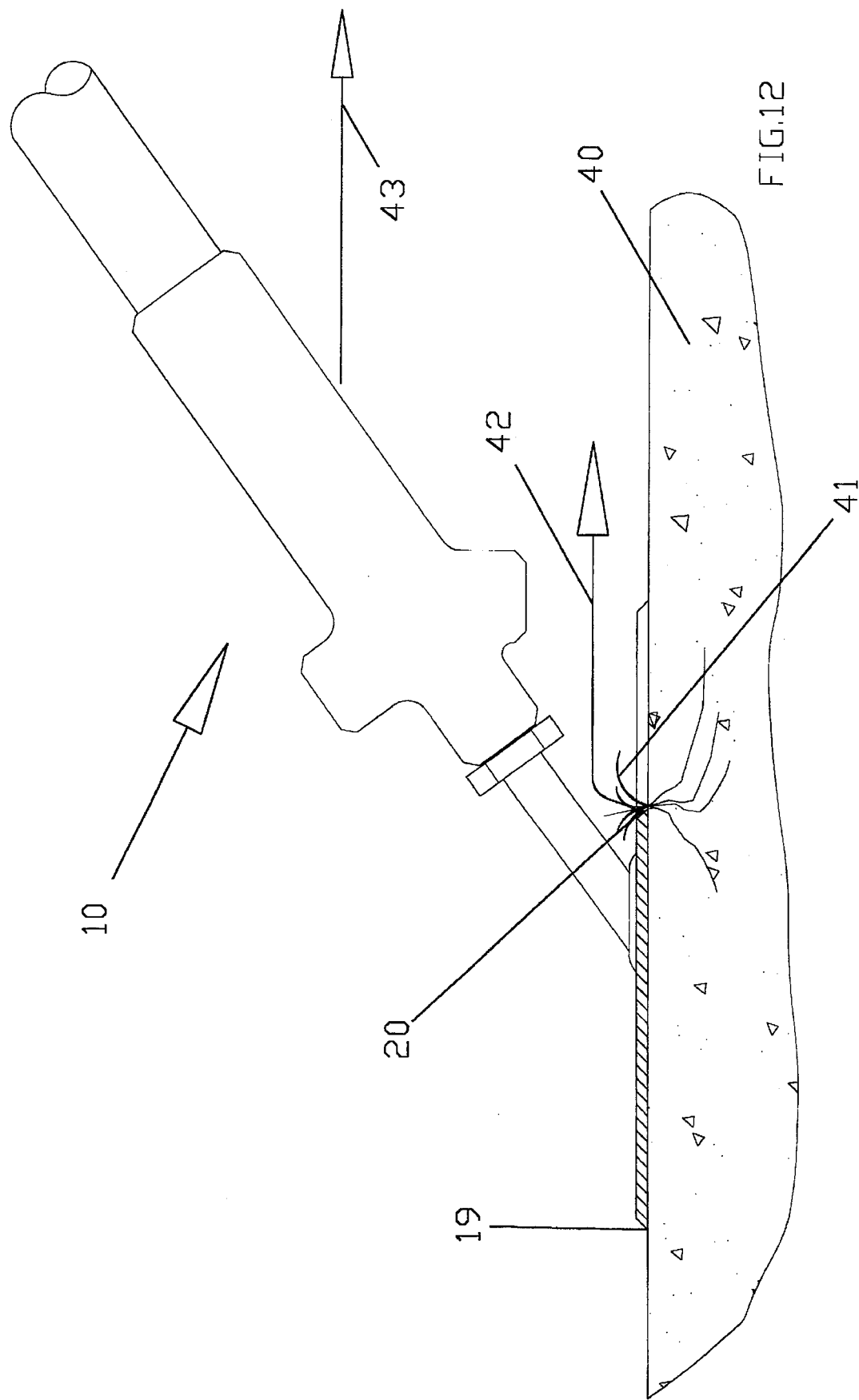

LAWN AND GARDEN TOOL

RELATED APPLICATION

This application is a Continuation-In-Part of Provisional application Ser. No. 60/003,948, filed Sep. 19, 1995.

BACKGROUND OF THE INVENTION

1. Field of the Invention

The invention relates generally to garden tools and more particularly to the hoe type garden tool having a unique heart shape and includes multiple edges and angles configured to perform various garden tasks and a handle with a disconnect head which is equipped with three different angles.

2. Discussion of the Prior Art

It is common practice when weeding and/or cultivating to use a hoe, which is a long handled implement having a straight edge blade fastened perpendicular to the handle. This implement performs a chopping action upon the ground for the purpose of breaking, loosening, and digging out weeds. This chopping and digging process is activated by the operator with his extended arm and offers very poor leverage. The straight cutting edge of this implement is very inefficient for cutting into the ground and further makes hoeing a very exhaustive and back breaking task.

Agricultural implements of various kinds are known for use in manual operations for working the soil, cutting weeds, and their roots beneath the surface of the ground, pulverizing the upper crust of the earth for planting of seeds, furrowing the pulverized crust for planting, and hoeing or covering the planted seeds or fertilizer. Furthermore, various kinds of agricultural implements have been used which accomplish a combination of these agricultural operations. However, a single implement which is simply constructed and economical for purchase by the average homeowner who desires to have his own garden spot which is useful for weeding, pulverizing the upper crust of the earth, furrowing and covering the furrows, is not known.

Several prior art devices have attempted to provide the required operations, as, for example, the U.S. Pat. No. 2,011,062 to Masamitsu which discloses a gardening implement comprised of a substantially flat plate-like blade of a generally triangular outline. The blade is shaped such that the two edges are concaved and of like curvature and length whereas the other and longer edge is formed at a point centrally of its ends with a rounded outwardly projecting edge portion.

U.S. Pat. No. 3,545,551 to Niemeyer discloses an interchangeable blade hoe kit which includes a handle with a hollow cylindrical terminal portion which is threaded internally so as to screw on to the extensions of the blades. A hole is drilled angularly through both the handle and the extensions where they screw together to provide registering apertures for the insertion of a bolt which is engaged by a nut.

U.S. Pat. No. 4,730,679 to Tallerico et al discloses a garden tool handle and a connected head part. The head part includes multiple sides, each formed into a tool part for performing a specific garden task.

U.S. Pat. No. 5,272,788 to Gilstrap discloses an interchangeable handle and utility tool head system where different tool heads are used with the handle. The different tool heads have similar shanks with a screw threaded end. The handle has a female coupling on one end to receive the screw threaded shank. A positive securing device prevents rotation of the tool head relative to the handle where a keyway and key system prevents the rotation.

U.S. Pat. No. 5,161,278 to Tomm discloses a handle connector with an anti-loosening lock comprising a head member having an internally threaded handle receiving opening with a handle connected with the head member by a manually releasable connector assembly positioned between the head member and a first end of the handle.

U.S. Pat. No. 4,730,679 to Tallerico et al discloses a handle and a connected head part. The head part includes multiple sides each formed into a tool part for performing a specific garden task. The shorter end edges of the head are formed into a pointed nose and a slotted hoe. One longer side edge of the head part includes formed projections which define slots with the opposite side edge of the head part having downturned arched projections formed there along which alternate with flat projections. The head part is bowed form side edge to side edge to facilitate use of the nose and hoe.

SUMMARY OF THE INVENTION

The invention is a wooden handled, heart shaped garden tool and includes multiple edges and angles configured to perform various garden tasks and a bolt attached thereon to mate with a handle equipped with three different mounting angles. The handle is made from a hard wood or plastic and comes in either 5 foot or 6 foot lengths. The long handles allow for the user to stand upright while working. Attached to the end of the handle, furthest from the user is a 6 inch long connector with three different angled connections or bosses. These bosses are threaded on the interior to accept a ½" threadrod. One boss comes straight from the end of the connector, the second boss is ninety degrees from the connector and handle, and the third boss is fifty four degrees from the connector and handle. A disconnect has also been designed for the center of the handle to allow it to be taken apart for ease of shipping or storing or to add a longer length handle section.

BRIEF DESCRIPTION OF THE DRAWINGS

FIG. 3 is a top view of the heart shaped blade of the invention.

FIG. 4 is a side view of the heart shaped blade of the invention.

FIG. 7 is a side view of the heart shaped blade mounted in the 54° boss of the disconnect head of the invention.

FIG. 8 a side view of the heart shaped blade mounted in the 90° boss of the disconnect head of the invention.

FIG. 9 is a side view of the heart shaped blade mounted in the end boss of the disconnect head of the invention.

FIG. 10 is a side view of the invention in a vertical cutting position.

FIG. 11 is a side view of the invention in a horizontal cutting position.

FIG. 12 is a side view of the invention in a horizontal position being used as a weed puller. DESCRIPTION OF THE PREFERRED EMBODIMENTS Referring now to the drawings, the reference numeral 10 refers generally to the heart shaped garden tool of this invention. Tool 10 includes an elongated handle 17 formed of wood or similar material. The heart shaped head 18 is preferably formed of durable, rigid, material such as metal or metal alloys, and may comprise three different blades (4", 6" and 7") made from 12 gauge steel. A ½" threadrod 16, which is 3" long may be welded to the center of each blade at a thirty six degree angle. A locking nut 15 is threaded on the threadrod 16 and when the threadrod 16 is threaded into one of the threaded connector holes 12, 13, or 14 located in connector 11, on handle 17, the threadrod 16 is locked in place with locking nut 15.

Figure 1:
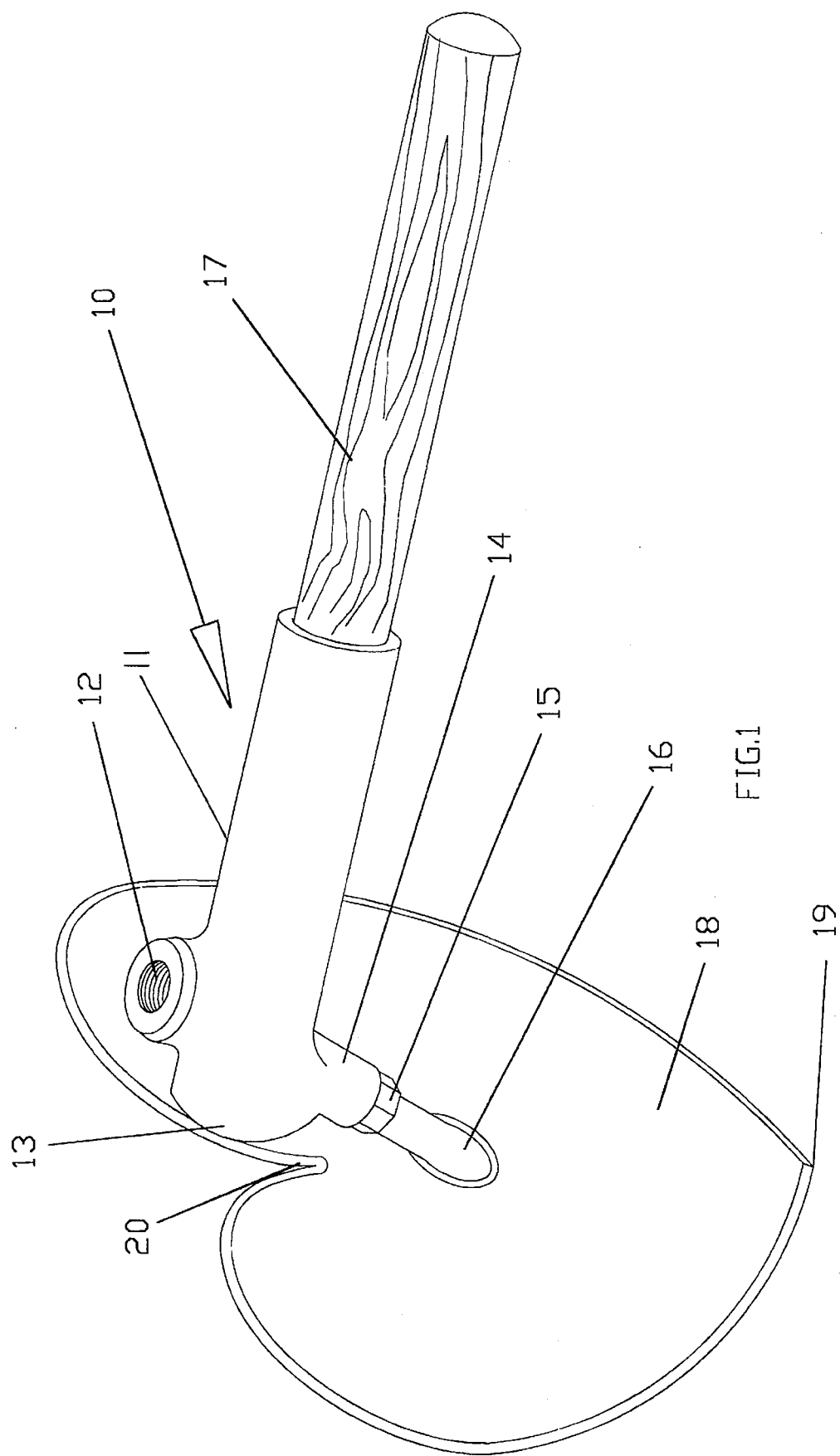
FIG. 1 is a top, rear, perspective view, partially cutaway, showing the heart shaped blade at 90° to the handle.
Figure 2:
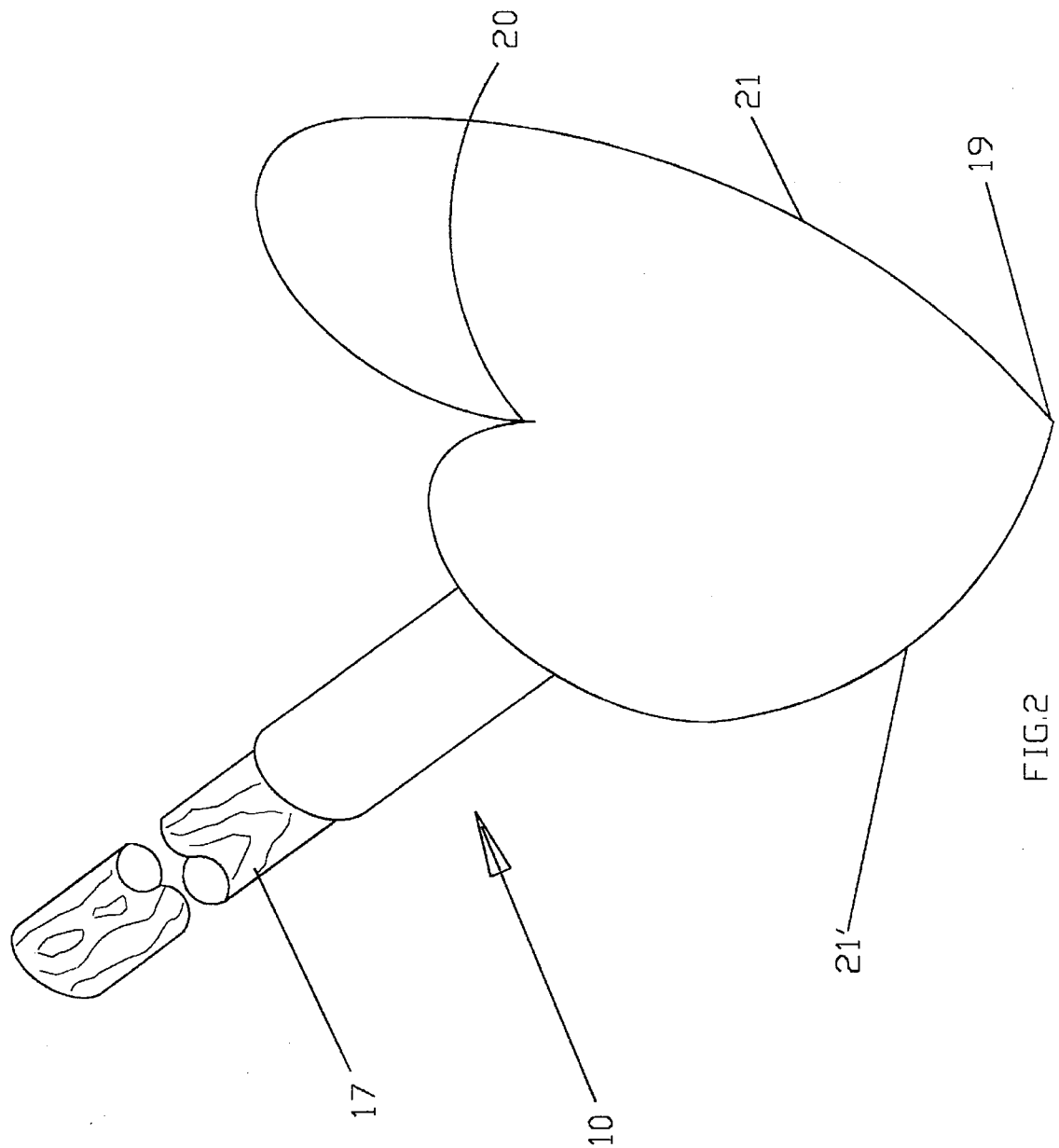
FIG. 2 is a top, front, perspective view, partially cutaway, showing the heart shaped blade at 90° to the handle.

The heart shaped head 18 may be made in different sizes to suit the use for which it is being applied. A small heart (4") may be used for removing individual weeds from flower beds and yards. A (6") heart is for use for normal sized yards and gardens and the (7") heart is for larger yards and gardens. All three blade sizes are equipped with a very sharp edge 21 that has been hand sharpened.

The heart shape results from forming the head 18 with a pointed snout 19 at a first end and a "V" shape 20 at a second end opposite the snout 19. When each of the several sized heart shaped heads 18 are connected to the handle 17 and connector 11, several different tools are created with various uses for each tool.

Figure 5:
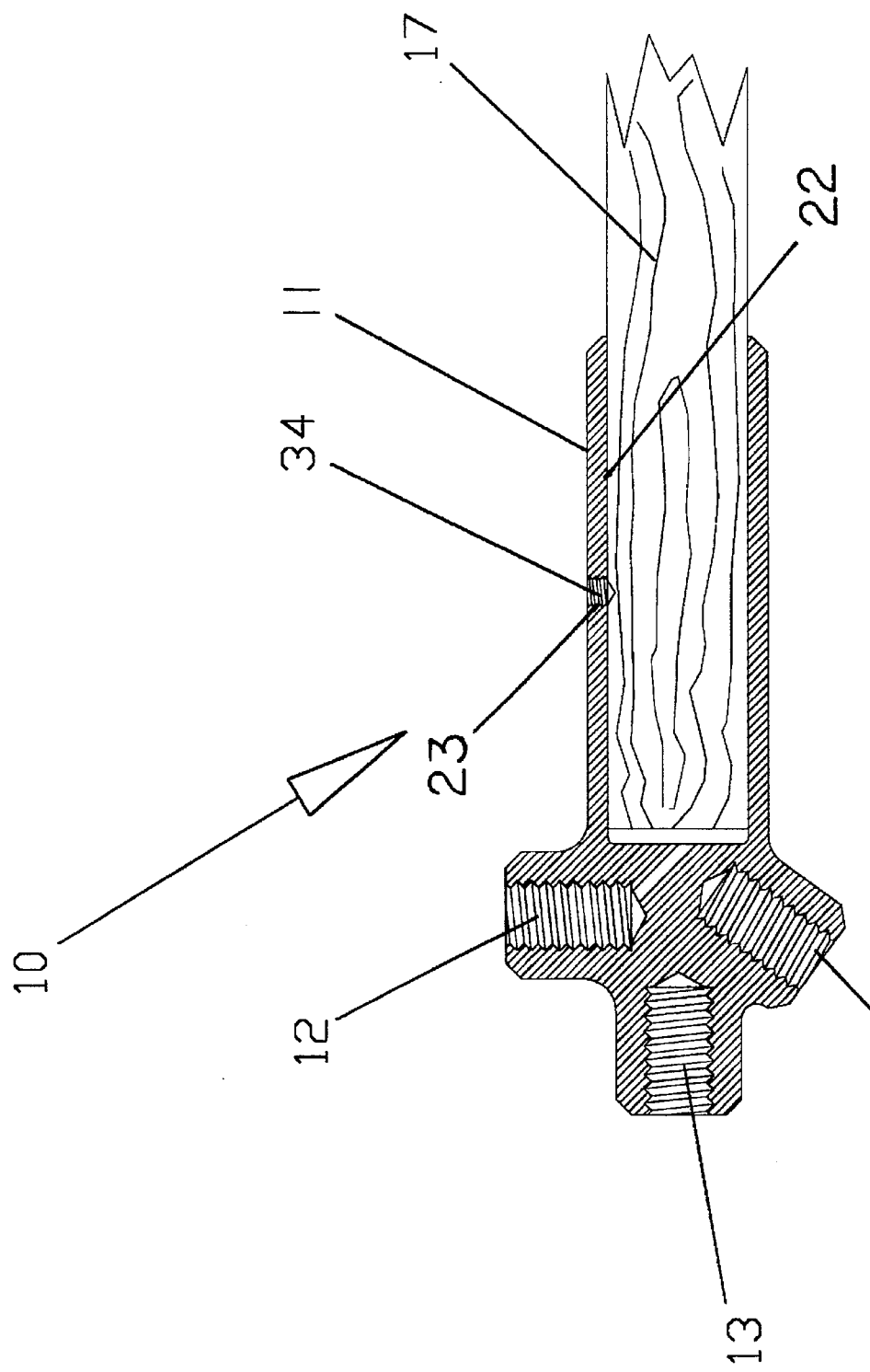
FIG. 5 is a side sectional view of the disconnect head of the invention with the handle cutaway.

FIGS. 3 and 4 more clearly show the sharpened edges 21 and 21' on the top surface of heart shaped head 18. FIG. 5 is a sectional view of the connector 11 having a mounting hole 22 beginning at a first end and running to a point near a second end of the connector 11 where three bosses 12, 13, and 14 are formed. Connector 11 is fastened to handle 17 with a set screw 34 threaded in a hole 23 formed in connector 11. A first threaded connector hole 12 (boss) is formed in connector 11 at 90° to the center line of connector 11. A second threaded connector hole 13 (boss) is formed in connector 11 at the end of connector 11 parallel to the center line of connector 11. A third threaded connector hole 14 (boss) is formed in connector 11 at 54° to the center line of connector 11.

The relationship of the heart shaped blade head 18 with threadrod 16 which is 36° to head 18, when attached to the different angles on the handle connector 11 are as follows. When head 18 is attached to the boss 13 coming directly from the end of the handle 17, (FIG. 9) the resulting tool edges, weeds, cuts, pulls weeds, digs holes, and removes ice from walks and drives. The pointed end of snout 19 goes through the soil easier than a round shape. The "V" shape 20 in the back of the blade 18 becomes a weed puller by locking the "V" shape 20 (FIG. 12) on weed 41 growing in soil 40 and pulling handle 17 in the direction shown by arrow 43 and thereby pulling weed 41 up and out as shown by the arrow 42. The blade 18 becomes a weed puller by locking the weed 41 needing to be pulled and either jerking the weed 41 out of the soil 40, or in the case of a tough weed 42, the weed 42 is locked in the "V" shape 20 and the handle is lifted upwardly using the snout 19 of the heart shaped blade 18 as a fulcrum and the weed 42 is lifted roots and all.

To dig holes, the operator simply sinks the snout 19 into hole. When the handle is lowered to a normal position for the user, the blade 18 will have cut its way across the hole and will be loaded with soil and in a flat position ready to be lifted from the hole.

To remove ice from sidewalks, the user would turn the blade 18 on its side to be in the cutting position. A few chops of the blade 18 and an opening will be made in the ice. The point 19 and the sharp edge 20, 21 are placed under the sheet of ice to loosen and remove the ice.

To remove sod, the blade 18 is turned on its side in the cutting position and a cut is made in the sod. The blade 18 is then turned on its other side and a second cut, opposite the first, is made. Two more cuts are made in the sod to create a square. The handle 17 is held in an upright position and the snout 19 is inserted into one of the cuts. By bringing the handle down, the blade 18 changes pitch and cuts under the sod. The blade 18 is now flat and completely under the sod which can be lifted from the ground.

Attaching blade 18 to the fifty four degree boss 14 results in an angle of ninety degrees to the handle 17. This creates a tool similar to the common garden hoe but with a point entering the ground 40. In this position, the tool 10 not only weeds and chops, but creates a planting furrow by pulling the point of the heart through the soil. When the blade 18 is turned over with the "V" notch 20 facing downward, and pulled down the newly planted furrow, the two half round shoulders of the heart on either side of the notch 20 cover the furrow over.

When the heart shaped blade 18 is attached to the ninety degree boss 12, the point 19 of the heart is angled backward and becomes a very effective digging tool that takes full advantage of the sharp blade 18, angle of entry, and pulling power of the user. The tool 10 in this position, will be used in those areas that are heavily overgrown or that contain hard, compacted soil.

Figure 6:
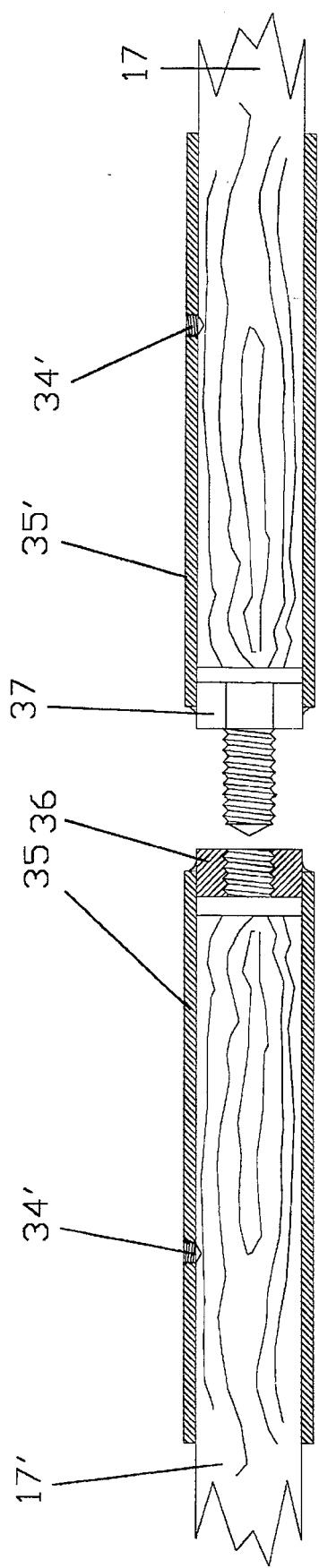
FIG. 6 is a sectional view of a handle coupling.

FIG. 6 shows a coupling which may be used to extend the length of handle 17. Sleeves 35 and 35' are placed over the FIG. 6 shows a coupling which may be used to extend the length of handle 17. Sleeves 35 and 35' are placed over the handle 17 ends and held in place with set screws 34'. The coupling consists of a bolt 37 welded inside the sleeve 35' and a locking nut is screwed thereon. Nut 36 is welded inside sleeve 35. The two handle 17 parts are joined with bolt 37 and reverse flange nut 36, and locked in place.

With two different length handles, three different connecting angles on the handle, and three different heart shaped blades, the invention offers the user a variety of tools to make many jobs in the yard and garden much easier. The heart shaped garden tool of the invention cuts, trims, edges, and weeds in minutes with no bending or stooping.

The heart shaped blade 18 may be a 12 GA. steel blade which resharpens easily with an ordinary file. Filing the top surface edge of the blade 18 provides a sharp cutting surface with the bottom surface being flat and the top surface being shaped downwardly to form the sharp edge. As pressure is exerted on the top of blade 18, the sharp edge begins to penetrate the ground surface and the sharpened edge continues to be guided downwardly, and deeper into the surface to be cut.

Several other attachments have been designed for the handle 17 and connector 11 including hoes, a rake, a cultivator, fork and others.

It will be realized that various changes may be made to the specific embodiment shown and described without departing from the principles and spirit of the present invention.

What is claimed is:

1. A heart shaped garden tool configured to perform various garden tasks, said tool comprising:

an elongated handle sufficiently long to permit a user to stand upright while working, a tool connector formed with a handle mounting hole beginning at a first end and running to a point near a second end, a threaded set screw mounting hole formed in said connector, a first threaded connector boss formed in said connector, a second threaded connector boss formed in said connector at said second end, parallel to a center line of said connector, and a third threaded connector boss formed in said connector, and a heart shaped blade head having a top side, a bottom side, and an outer edge, and having a threadrod attached on said top side near a center point at an angle of 36° said heart shape formed by a pointed snout at a first end and a "V" shaped notch at a second end opposite said snout, a half round shoulder on each side of said notch and each of said shoulders running along said outer edge to said snout, said outer edge being sharpened along said top side, said tool connector being assembled on said handle, and fastened thereto, and said threadrod being assembled with said first connector boss to form a backward angle for digging, to said second connector boss to form an angle for edging, weeding, digging holes, and removing ice from walks, and to said third connector boss to form an angled, pointed hoe for weeding, chopping, hoeing and planting.

2. The heart shaped tool of claim 1 wherein said first threaded connector boss is formed at 90° to said mounting hole and said third threaded boss is formed in said connector at 54° to a center line of said connector.

3. A heart shaped garden tool configured to perform various garden tasks, said tool comprising:

an elongated handle having a first end and a second end, and sufficiently long to permit a user to stand upright while working, a tool connector formed with a handle mounting hole beginning at a first end and running to a point near a second end, a threaded set screw mounting hole formed in said connector, a first threaded connector boss formed in said connector, at 90° to said mounting hole, a second threaded connector boss formed in said connector at said second end, parallel to a center line of said connector, and a third threaded connector boss formed in said connector at 54° to a center line of said connector, a heart shaped blade head having a top side, a bottom side and an outer edge, and having a threadrod attached on said top side near a center point at an angle of 36°, said heart shape formed by a pointed snout at a first end and a "V" shaped notch at a second end opposite said snout, a half round shoulder on each side of said notch and running along said outer edge to said snout, said outer edge being sharpened along said top side, said tool connector being assembled on said first end of said handle, and fastened thereto, and said threadrod being assembled with said first connector boss to form a backward angle for digging, to said second connector boss to form a 36° angle for edging, weeding, digging holes, and removing ice from walks, and to said third connector boss to form a 90° angle, pointed hoe for weeding, chopping, hoeing, and planting.

4. The heart shaped tool of claim 3 wherein said handle length is extended with a first coupling placed over said second end of said handle and held in place with a set screw, and a second coupling placed over a handle extension and held in place with a set screw, said couplings having mating screw means for connecting said two couplings and thereby extending the length of said tool handle.

* * * * *